(12) United States Patent
Sen et al.

(10) Patent No.: US 11,290,392 B2
(45) Date of Patent: Mar. 29, 2022

(54) TECHNOLOGIES FOR POOLING ACCELERATOR OVER FABRIC

(71) Applicant: Intel Corporation, Santa Clara, CA (US)

(72) Inventors: Sujoy Sen, Portland, OR (US); Mohan J. Kumar, Aloha, OR (US); Donald L. Faw, Hillsboro, OR (US); Susanne M. Balle, Hudson, NH (US); Narayan Ranganathan, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 688 days.

(21) Appl. No.: 15/620,376

(22) Filed: Jun. 12, 2017

(65) Prior Publication Data

US 2018/0219797 A1 Aug. 2, 2018

Related U.S. Application Data

(60) Provisional application No. 62/452,338, filed on Jan. 30, 2017.

(51) Int. Cl.
| | |
|---|---|
| *H04L 12/927* | (2013.01) |
| *H04L 29/08* | (2006.01) |
| *H04L 12/933* | (2013.01) |
| *H04L 12/865* | (2013.01) |
| *H04L 47/80* | (2022.01) |
| *H04L 67/00* | (2022.01) |
| *H04L 49/109* | (2022.01) |
| *H04L 67/1097* | (2022.01) |
| *H04L 47/6275* | (2022.01) |

(52) U.S. Cl.
CPC .......... *H04L 47/803* (2013.01); *H04L 49/109* (2013.01); *H04L 67/1097* (2013.01); *H04L 67/34* (2013.01); *H04L 47/6275* (2013.01)

(58) Field of Classification Search
None
See application file for complete search history.

(56) References Cited

U.S. PATENT DOCUMENTS 9,813,283 B2 * 11/2017 Cohen ............... H04L 29/08549
2002/0143907 A1 * 10/2002 Tsurubayashi .......... H04L 67/34
709/221

(Continued)

FOREIGN PATENT DOCUMENTS

WO 2015-042684 A1 4/2015

OTHER PUBLICATIONS

International search report for PCT application No. PCT/US2018/012297, dated Apr. 14, 2018 (3 pages).

(Continued)

*Primary Examiner* — Scott B Christensen
(74) *Attorney, Agent, or Firm* — Compass IP Law PC (57) ABSTRACT

Technologies for pooling accelerators over fabric are disclosed. In the illustrative embodiment, an application may access an accelerator device over an application programming interface (API) and the API can access an accelerator device that is either local or a remote accelerator device that is located on a remote accelerator sled over a network fabric. The API may employ a send queue and a receive queue to send and receive command capsules to and from the accelerator sled.

22 Claims, 5 Drawing Sheets

(56) References Cited

U.S. PATENT DOCUMENTS

| | | | |
|---|---|---|---|
| 2003/0191860 A1* | 10/2003 | Gadepalli | G06F 9/5055 |
| | | | 709/247 |
| 2006/0262797 A1 | 11/2006 | Biran et al. | |
| 2012/0254587 A1* | 10/2012 | Biran | G06F 9/3877 |
| | | | 712/34 |
| 2013/0027735 A1* | 1/2013 | Kitada, I | G06K 15/1857 |
| | | | 358/1.13 |
| 2013/0038425 A1 | 2/2013 | Sugiyama et al. | |
| 2013/0262678 A1* | 10/2013 | Tung | G06F 9/5072 |
| | | | 709/226 |
| 2014/0173113 A1* | 6/2014 | Vemuri | H04L 67/322 |
| | | | 709/226 |
| 2014/0184622 A1* | 7/2014 | Xia | G06T 1/20 |
| | | | 345/522 |
| 2015/0237356 A1* | 8/2015 | Wu | H04N 19/42 |
| | | | 375/240.03 |
| 2016/0196221 A1* | 7/2016 | Wan | G06F 13/1642 |
| | | | 710/310 |
| 2016/0283158 A1 | 9/2016 | Bertolli et al. | |
| 2016/0335215 A1 | 11/2016 | Biran et al. | |

OTHER PUBLICATIONS

Written opinion for PCT application No. PCT/US2018/012297, dated Apr. 14, 2018 (7 pages).

\* cited by examiner

TECHNOLOGIES FOR POOLING ACCELERATOR OVER FABRIC

CROSS-REFERENCE TO RELATED APPLICATION

The present application claims the benefit of U.S. Provisional Patent Application No. 62/452,338, entitled "TECHNOLOGIES FOR POOLING ACCELERATORS OVER FABRIC," which was filed on Jan. 30, 2017.

BACKGROUND

Certain computing tasks may be performed more quickly by a hardware accelerator, such as a field programmable gate array (FPGA), application specific integrated circuit (ASIC), or graphics processing unit (GPU), than by a central processing unit. Compute devices are increasingly employing hardware accelerators in order to perform suitable computing tasks more quickly. In many applications, the accelerators may be locally accessible to a central processing unit using a Peripheral Component Interconnect Express (PCIe) or similar connection.

One drawback with the incorporation of a hardware accelerator into a compute device is that the hardware accelerator may be unused much of the time. Depending on the particular task being performed by the compute device, the hardware accelerator may experience a high level of use some times and a low or no level of use at other times, which may be an inefficient allocation of resources.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one of A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
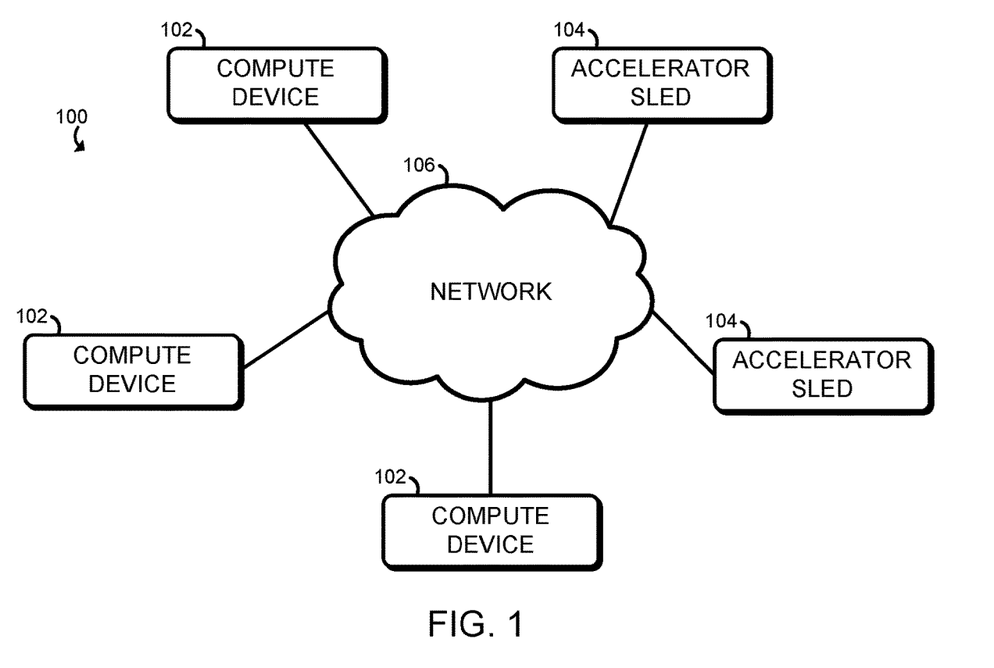
FIG. 1 is a simplified block diagram of at least one embodiment of a network for pooling accelerators over a fabric.

Referring now to FIG. 1, a system 100 for the pooling of accelerators includes one or more compute devices 102 and one or more accelerator sleds 104 which are communicatively connected together by an illustrative network 106. In the illustrative embodiment, a compute device 102 may access an accelerator device 212 that is local to the compute device 102, or the compute device 102 may access an accelerator device 308 on an accelerator sled 104 remote from the compute device 102. In particular, in the illustrative embodiment, an application being executed by a processor 202 of the compute device 102 (see FIG. 2) may access an accelerator device 212 or 308 (see FIGS. 2 and 3) in a manner that is transparent to the application. For example, the application may access an application program interface (API), and the API may be able to transparently perform the requested function on either a local accelerator device 212 or a remote accelerator device 308 without requiring any involvement from the underlying application. The API may select a local accelerator device 212 or a remote accelerator device 308 based on any number of factors, such as the physical presence or absence of the local accelerator device 212 and/or the remote accelerator device 308, a present usage of the local accelerator device 212 and/or the remote accelerator device 308, a configuration setting of the compute device 102 that may be set by an administrator of the system 100, etc.

The network 106 may be embodied as any type of network capable of communicatively connecting the compute devices 102 and the accelerator sleds 104. For example, the system 100 may be embodied as a high performance computing system or a data center, and the network 106 may be established through a series of cables, switches, and other devices connecting the various compute devices 102 and accelerator sleds 104 of the data center.

Figure 2:
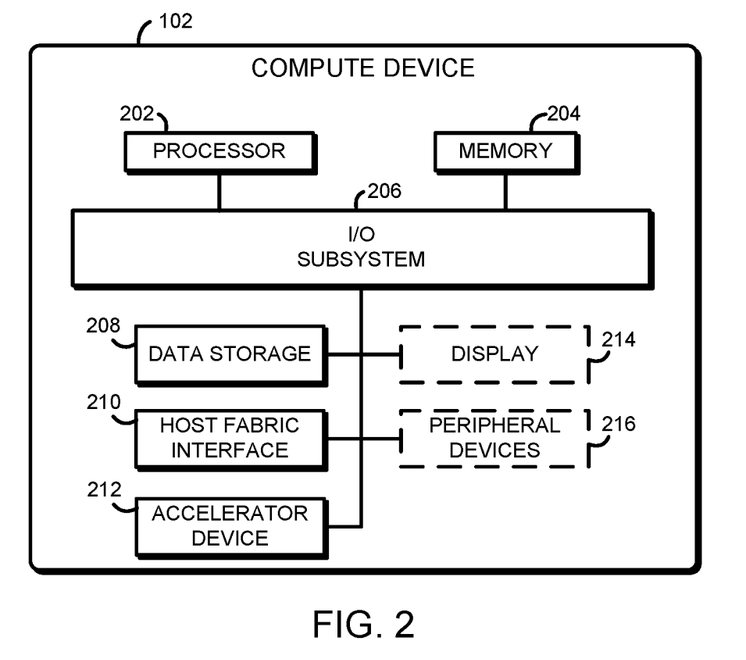
FIG. 2 is a simplified block diagram of at least one embodiment of a compute device of FIG. 1.

Referring now to FIG. 2, an illustrative compute device 102 of the system 100 may be embodied as any type of compute device capable of performing the functions described herein. For example, the compute device 102 may be embodied as or otherwise be included in, without limitation, a server computer, a desktop computer, a sled or blade of a rack, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative compute device 102 includes the processor 202, a memory 204, an input/output (I/O) subsystem 206, data storage 208, a host fabric interface 210, and an accelerator device 212. In some embodiments, one or more of the illustrative components of the compute device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 102 on a single integrated circuit chip.

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The host fabric interface 210 may be embodied as any type of interface capable of interfacing the compute device 102 with the network 106. The host fabric interface 210 may also be referred to or be embodied as a network interface controller (NIC). The host fabric interface 210 may be capable of interfacing with any appropriate cable type, such as an electrical cable or an optical cable. The host fabric interface 210 may be configured to use any one or more communication technology and associated protocols (e.g., Ethernet, Bluetooth®, Wi-Fi®, WiMAX, near field communication (NFC), Omni-Path, etc.). In use, the host fabric interface 210 may be capable of directly accessing certain portions of the memory 204 based on instructions from the compute device 102 or based on messages received from other compute devices 102, including reading from and writing to those portions of the memory 204. Additionally, the host fabric interface 210 may be capable of performing a particular interface, standard, or protocol, such as the transmission control protocol (TCP), the Portals 4.0 Network Programming Interface, published by Sandia National Labs in November 2012 with designation SAND2012-10087, the Message Passing Interface Standard Version 3.1 (MPI 3.1), published by the Message Passing Interface Forum on Jun. 4, 2015, the Remote Direct Memory Access (RDMA) over Converged Ethernet (RoCE) standard, published on Apr. 6, 2010, by the InfiniBand™ Trade Association, RoCEv2 standard, published on Sep. 2, 2014, by the InfiniBand™ Trade Association, the internet Wide Area RDMA Protocol (iWARP) compatible with some or all of the Requests for Comments (RFC) 5040 (dated October 2007), 5041 (dated October 2007), 5042 (dated October 2007), 5043 (dated October 2007), 5044 (dated October 2007), 6580 (dated April 2012), 6581 (dated April 2014), and 7306 (dated June 2014) published by the Internet Engineering Task Force (IETF), or similar operations that may employ direct memory access or a partitioned global address space (PGAS). In some embodiments, the host fabric interface 210 may include additional electrical components such as a dedicated processor and memory. Additionally or alternatively, in some embodiments, the host fabric interface 210 may include a pipeline architecture in which at least some of the functions performed by the host fabric interface 210 are performed by dedicated hardware devices or sub-components. Furthermore, in some embodiments, the host fabric interface 210 may be in a package separate from the processor 202, in a multi-chip package with the processor 202, or in a system-on-a-chip with the processor 202.

The accelerator device 212 may be embodied as any type of device capable of performing certain computing tasks more quickly or more efficiently relative to the processor 202. For example, the accelerator device 212 may be particularly well suited for tasks such as matrix multiplication, implementing a neural network, image processing, etc. The accelerator device 212 may be embodied as, for example, a field programmable gate array (FPGA), an application specific integrated circuit (ASIC), a graphics processing unit (GPU), etc. The accelerator device 212 may be connected to other components of the compute device 102 such as the processor 202 and the memory 204 through any suitable connection, such as a PCIe connection, a QuickPath interconnect, a HyperTransport interconnect, etc. It should be appreciated that, in some embodiments, the compute device 102 may not include a local accelerator device 212.

Of course, in some embodiments, the compute device 102 may include additional components often found in a compute device 102, such as a display 214 and/or one or more peripheral devices 216. The peripheral devices 216 may include a keyboard, a mouse, a camera, etc. The display 214 may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
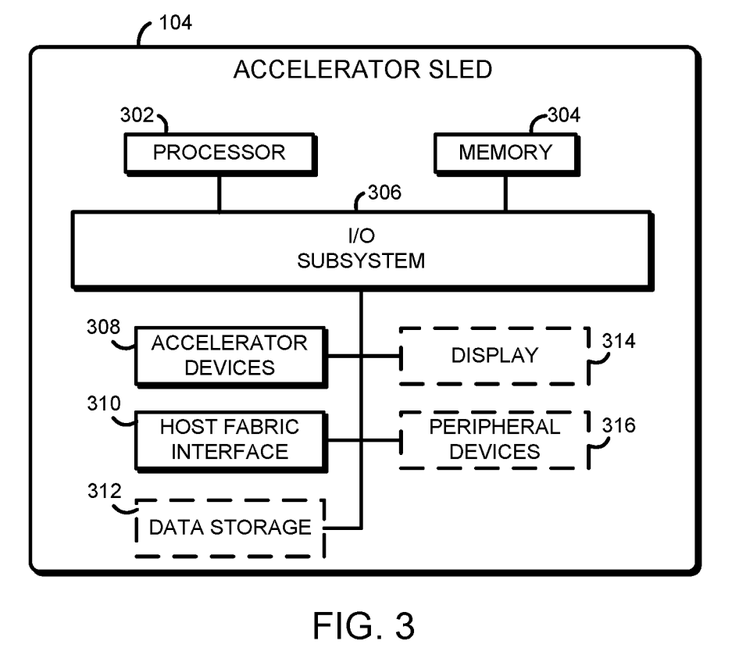
FIG. 3 is a simplified block diagram of at least one embodiment of an accelerator sled of FIG. 1.

Referring now to FIG. 3, an illustrative accelerator sled 104 of the system 100 may be embodied as any type of compute device capable of performing the functions described herein. In the illustrative embodiment, the accelerator sled 104 is embodied as a sled or blade of a rack in a data center. Additionally or alternative, the accelerator sled 104 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative accelerator sled 104 includes a processor 302, a memory 304, an I/O subsystem 306, one or more accelerator devices 308, a host fabric interface 310, data storage 312, an optional display 314, and optional peripheral devices 316. Each of the processor 302, the memory 304, the I/O subsystem 306, the one or more accelerator devices 308, the host fabric interface 310, the data storage 312, the optional display 314, and the optional peripheral devices 316 may be similar to the corresponding components of the compute device 102. As such, the description of those components of the compute device 102 is equally applicable to the description of those components of the accelerator sled 104 and is not repeated herein in the interest of clarity of the description. However, it should be appreciated that, in some embodiments, the architecture or configuration of the accelerator sled 104 may be significantly different from the architecture or configuration of the compute sled 102. For example, the accelerator sled 104 may have a processor 302 that is relatively slow as compared to the processor 202, and the accelerator sled 104 may include several accelerator devices 308 that are relatively powerful as compared to the accelerator device 212 of the compute device 102 (if the compute device 102 even has an accelerator device 212).

Figure 4:
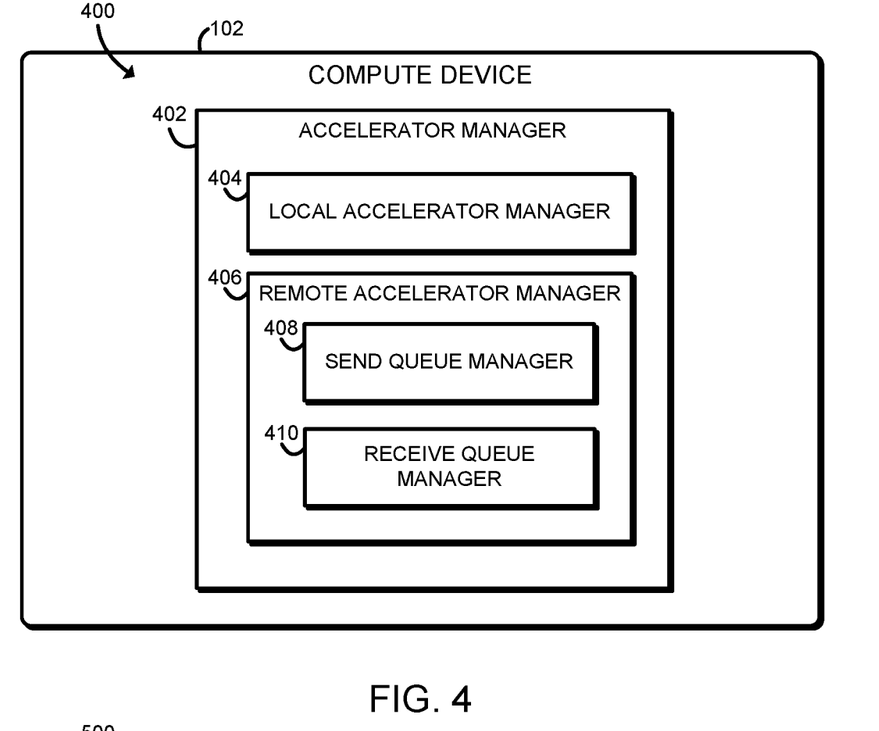
FIG. 4 is a block diagram of at least one embodiment of an environment that may be established by the compute device of FIG. 1.

Referring now to FIG. 4, in use, the compute device 102 may establish an environment 400. The illustrative environment 400 includes an accelerator manager 402, which includes a local accelerator manager 404 and a remote accelerator manager 406. The various components of the environment 400 may be embodied as hardware, firmware, software, or a combination thereof. As such, in some embodiments, one or more of the components of the environment 400 may be embodied as circuitry or collection of electrical devices (e.g., an accelerator manager circuit 402, a local accelerator manager circuit 404 and/or a remote accelerator manager circuit 406, etc.). It should be appreciated that, in such embodiments the accelerator manager circuit 402, the local accelerator manager circuit 404, and/or the remote accelerator manager circuit 406, etc., may form a portion of one or more of the processor 202, the I/O subsystem 206, the host fabric interface 210, and/or other components of the compute device 102. Additionally, in some embodiments, one or more of the illustrative components may form a portion of another component and/or one or more of the illustrative components may be independent of one another. Further, in some embodiments, one or more of the components of the environment 400 may be embodied as virtualized hardware components or emulated architecture, which may be established and maintained by the processor 202 or other components of the compute device 102.

The accelerator manager 402 is configured to manage accelerators that an application executed by the processor 202 may interface with. In some embodiments, the accelerator manager 402 may implement an application programming interface for accessing an accelerator, such as the OpenCL Specification published by the Khronos OpenCL Working Group on Nov. 11, 2015. The accelerator manager 402 may interface with an application in such a manner that it is transparent or otherwise unknown to the application where the accelerator is physical located; that is, it is transparent or unknown to the application whether the used accelerator is a local accelerator device 212 or a remote accelerator device 308. For example, in some embodiments, the same application may be executed on a first compute device 102 with an accelerator manager 402 which facilitates an interface with a local accelerator device 212 and on a second compute device 102 with an acceleration manager 402 which facilitates an interface with a remote accelerator device 308 without any changes in how the application interacts with the accelerator manager 402 of the first compute device 102 and the accelerator manager 402 of the second compute device 102. In another example, in some embodiments, an application may interact with an accelerator manager 402 of a compute device 102 a first time and a second time. In such an example, for the first interaction, the accelerator manager 402 may facilitate an interface with a local accelerator device 212 and, for the second interaction, the accelerator manager 402 may facilitate an interface with a remote accelerator device 308, without any change or requirements in how the application interacts with the accelerator manager 402 between the first interaction and the second interaction. The accelerator manager 402 may select a local accelerator device 212 or a remote accelerator device 308 based on any number of factors, such as the physical presence or absence of the local accelerator device 212 and/or the remote accelerator device 308, a present usage of the local accelerator device 212 and/or the remote accelerator device 308, a configuration setting of the accelerator manager 402 that may be set by an administrator of the system 100, etc.

The local accelerator manager 404 is configured to manage the accelerator device 212 of the compute device 102. The local accelerator manager 404 may be implemented with use of a device driver or other software or firmware to interface with the hardware, firmware, or software of the accelerator device 212. The local accelerator manager 404 may facilitate the necessary functionality for interacting with the accelerator device 212, such as reading data from the accelerator device 212, writing data to the accelerator device 212, sending commands to the accelerator device 212, getting and setting properties of the accelerator device 212, receiving and processing events or notifications from the accelerator device 212 (such as processing an interrupt or setting a semaphore), etc.

The remote accelerator manager 406 is configured to provide an interface for an application executed by the compute device 102 to an accelerator device 308 on an accelerator sled 104. The remote accelerator manager 406 may communicate through the host fabric interface 210 of the compute device 102 with the host fabric interface 310 of the accelerator sled 104 using any suitable protocol or technique, such as TCP, RDMA, RoCE, RoCEv2, iWARP, etc. The remote accelerator manager 406 may facilitate the operations necessary to interface with the accelerator device 308, such as reading data from the accelerator device 308, writing data to the accelerator device 308, sending commands to the accelerator device 308, getting and setting properties of the accelerator device 308, receiving and processing events or notifications from the accelerator device 308 (such as processing an interrupt or setting a semaphore), etc. In the illustrative embodiment, the remote accelerator manager 406 may send and receive messages such as commands and data to and from the accelerator device 308 with use of message capsules, which include a command header portion and a data portion. The command header portion may include commands such as a read or write, a memory location, an instruction to load a program into the accelerator device 308, an instruction to execute a program by the accelerator device 308, an indication of the source compute device 102 or source processor 202, an indication of the target accelerator device 308, etc. The data portion may include the data to be written or data that has been read, a program to be loaded into the accelerator device 308, etc. In some embodiments, the data portion may be embodied as a scatter-gather list, which may be used, for example, with RDMA to transport RDMA keys and leverage RDMA read/write for direct data transfer.

In the illustrative embodiment, the remote accelerator manager 406 may employ a send queue and a receive queue to send and receive commands such as the message capsules to and from the accelerator sled 104. Illustratively, each queue operates as a first-in first-out data structure to buffer commands that are to be sent to and are received from the accelerator sled 104. To that end, the remote accelerator manager 406 may include a send queue manager 408 and a receive queue manager 410. The send queue manager 408 is configured to manage the send queue. The send queue manager 408 may accept new commands from an application being executed on the compute device 102 through the accelerator manager 402 and send the commands using the host fabric interface 210 to the accelerator sled 104. In the illustrative embodiment, the send queue manager 408 may maintain a separate control path queue and a data path queue. The control path queue may be used for control path functionality, such as discovering the accelerator devices 308, querying the capabilities of the accelerator devices 308, initializing a connection to the accelerator devices 308, providing credentials to the accelerator devices 308, etc. The data path queue may be used for data path functionality, such as readings and writing data and providing a program to be executed. In some embodiments, the send queue manager 408 may maintain several control path queues and/or data path queues. For example, the send queue manager 408 may maintain a separate control path queue for each processor 202 of the compute device 102. Additionally or alternatively, the send queue manager 408 may maintain a separate data path queues for different size jobs, such as a low-latency data path queue or a bulk data path queue. The send queue manager 408 may send jobs that are associated with a small amount of data and/or a short execution time to the low-latency data path queue and send jobs that are associated with a large amount of data and/or a long execution time to the bulk data path queue. In some embodiments, the send queue manager 408 may receive as part of the command an indication which queue should be used. For example, an application may provide an indication that the low-latency data path queue should be used for a command that is time-sensitive and may provide an indication that the bulk data path queue should be used for a command that is not time-sensitive.

The receive queue manager 410 is configured to manage the receive queue. Similar to the send queue manager 408, the receive queue manager 410 may maintain several separate queues, such as one or more control path queues and/or one or more data path queues.

It should be appreciated that, in some embodiments, some of the send queues and/or receive queues may be maintained and processed by hardware (i.e., by specialized hardware configured to perform certain instructions faster or more efficiently than a general purpose processor) and other queues of the send and/or receive queues may be maintained and processed by software (i.e., with a general purpose processor and memory). In the illustrative embodiment, each of the send and receive queues of the compute device 102 are maintained and processed by software.

Figure 5:
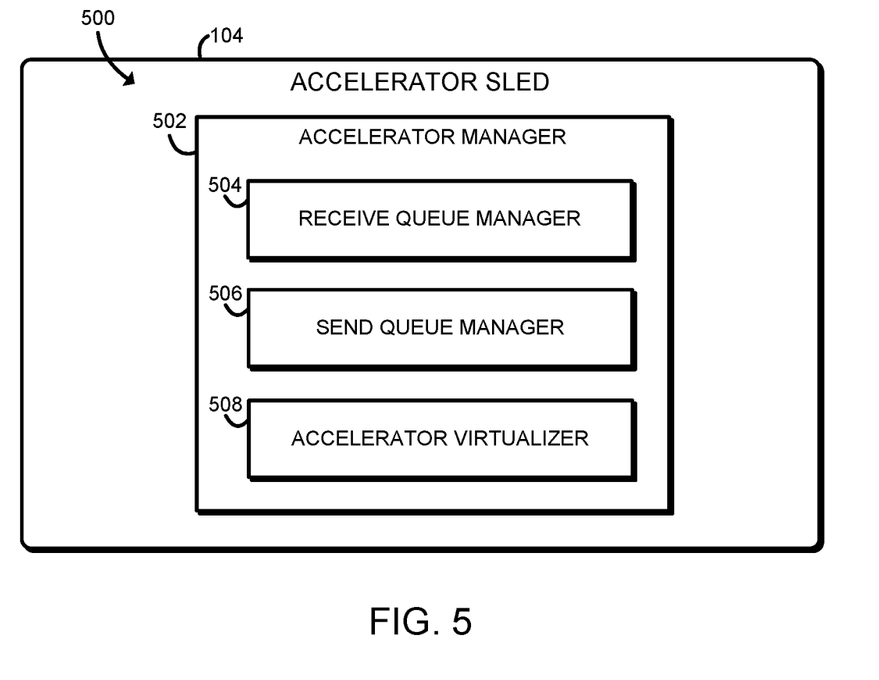
FIG. 5 is a block diagram of at least one embodiment of an environment that may be established by the accelerator of FIG. 1.

Referring now to FIG. 5, in use, the accelerator sled 104 may establish an environment 500. The illustrative environment 500 includes an accelerator manager 502, which includes a receive queue manager 504, a send queue manager 506, and an accelerator virtualizer 508. The various components of the environment 500 may be embodied as hardware, firmware, software, or a combination thereof. As such, in some embodiments, one or more of the components of the environment 500 may be embodied as circuitry or collection of electrical devices (e.g., an accelerator manager circuit 502, a receive queue manager circuit 504, a send queue manager circuit 506, and/or an accelerator virtualizer circuit 508, etc.). It should be appreciated that, in such embodiments the accelerator manager circuit 502, the receive queue manager circuit 504, the send queue manager circuit 506, and/or the accelerator virtualizer circuit 508, may form a portion of one or more of the processor 302, the I/O subsystem 306, the host fabric interface 310, and/or other components of the accelerator sled 104. Additionally, in some embodiments, one or more of the illustrative components may form a portion of another component and/or one or more of the illustrative components may be independent of one another. Further, in some embodiments, one or more of the components of the environment 500 may be embodied as virtualized hardware components or emulated architecture, which may be established and maintained by the processor 302 or other components of the accelerator sled 104.

The accelerator manager 502 is configured to manage the accelerator devices 308 on the accelerator sled 104 and to allow remote interfacing with the accelerator devices 308 through the host fabric interface 310. The accelerator manager 502 may process message capsules received from and sent to the compute device 102 and may, based on the content of the message capsules, execute the relevant necessary operations to interface with the accelerator devices 308, such as reading data from the accelerator device 308, writing data to the accelerator device 308, executing commands on the accelerator device 308, getting and setting properties of the accelerator device 308, receiving and processing events or notifications from the acceleration device 308 (such as sending a message capsule to send an interrupt or set a semaphore on the compute device 102), etc. The accelerator manager 502 may communicate through the host fabric interface 310 with the host fabric interface 210 on the compute device 102 using any suitable protocol, such as TCP, RDMA, RoCE, RoCEv2, iWARP, etc. The description of the message capsules used by the accelerator manager 502 is the same as for the remote accelerator manager 406, and will not be repeated in the interest of clarity.

Similar to the send queue manage 408 and the receive queue manager 410 of the accelerator manager 402 of the compute device, 102, each of the receive queue manager 504 and the send queue manager 506 manages a queue which operates as a first-in first-out data structure to buffer commands that are to be sent to and are received from the compute device 102. The receive queue manager 504 is configured to manage the receive queue. The receive queue manager 504 may receive messages from the compute device 102 over the host fabric interface 210 and pass the messages to the accelerator manager 502 and/or the accelerator device 308 for processing. In the illustrative embodiment, the receive queue manager 504 may maintain a separate control path queue and a data path queue. The control path queue may be used for control path functionality, such as receiving discovery requests of the accelerator devices 308, receiving queries of the capabilities of the accelerator devices 308, processing initialization of a connection with the accelerator devices 308, receiving credentials from the compute device 102, etc. The data path queue may be used for data path functionality, such as receiving read and write requests and receiving a program to be executed. In some embodiments, the receive queue manager 408 may maintain several control path queues and/or data path queues. For example, the receive queue manager 408 may maintain a separate control path queue for each accelerator device 308. Additionally or alternatively, the receive queue manager 408 may maintain a separate data path queues for different size jobs, such as a low-latency data path queue or a bulk data path queue. It should be appreciated that, in some embodiments, the accelerator sled 104 may process messages received in the receive queue asynchronously. For example, the accelerator sled 104 may complete processing a first message received in the receive queue that can be processed quickly, such as writing a small amount of data before completing processing of a second message received in the receive queue before the first message that may take longer to process, such as by executing a command on an accelerator device 308 which takes a long time to be executed. As another example, the receive queue manager 408 may, in some embodiments, begin processing messages received in the queue out of order.

The send queue manager 410 is configured to manage the send queue. Similar to the receive queue manager 408, the send queue manager 410 may maintain several separate queues, such as one or more control path queues and/or one or more data path queues. The send queue manager is configured to receive messages from the accelerator manager 502 and/or the accelerator devices 308 and send the messages to the compute device 102.

It should be appreciated that, in some embodiments, some of the send queues and/or receive queues may be maintained and processed by hardware (i.e., by specialized hardware configured to perform certain instructions faster or more efficiently than a general purpose processor) and others of the send and/or receive queues may be maintained and processed by software (i.e., with a general purpose processor and memory). In the illustrative embodiment, the receive control path queue is maintained and processed by software while the receive data path queue is maintained and processed by hardware.

The accelerator virtualizer 508 is configured to present one physical accelerator device 308 as two or more virtual accelerator devices 308. The accelerator virtualizer 508 may allow for two compute devices 102 or two processors 202 or threads on the same compute device 102 to access the same accelerator device 308 without any configuration necessary on the part of the compute device 102. For example, the accelerator manager 502 may send an indication to a compute device 102 that the accelerator sled 104 has two accelerator devices 308 available, which are in fact two virtual accelerator device 308 that correspond to one physical accelerator device 308. The compute device 102 may provide messages to each of the two virtual accelerator devices 308, which are processed by the physical accelerator device 308 in such a way as to provide the same response as if the commands were being processed on two physical accelerators 308 (although the messages may be processed more slowly as compared to two physical accelerators 308). To do so, the accelerator virtualizer 508 may employ virtualization techniques such as context switching and/or device partitioning.

Figure 6:
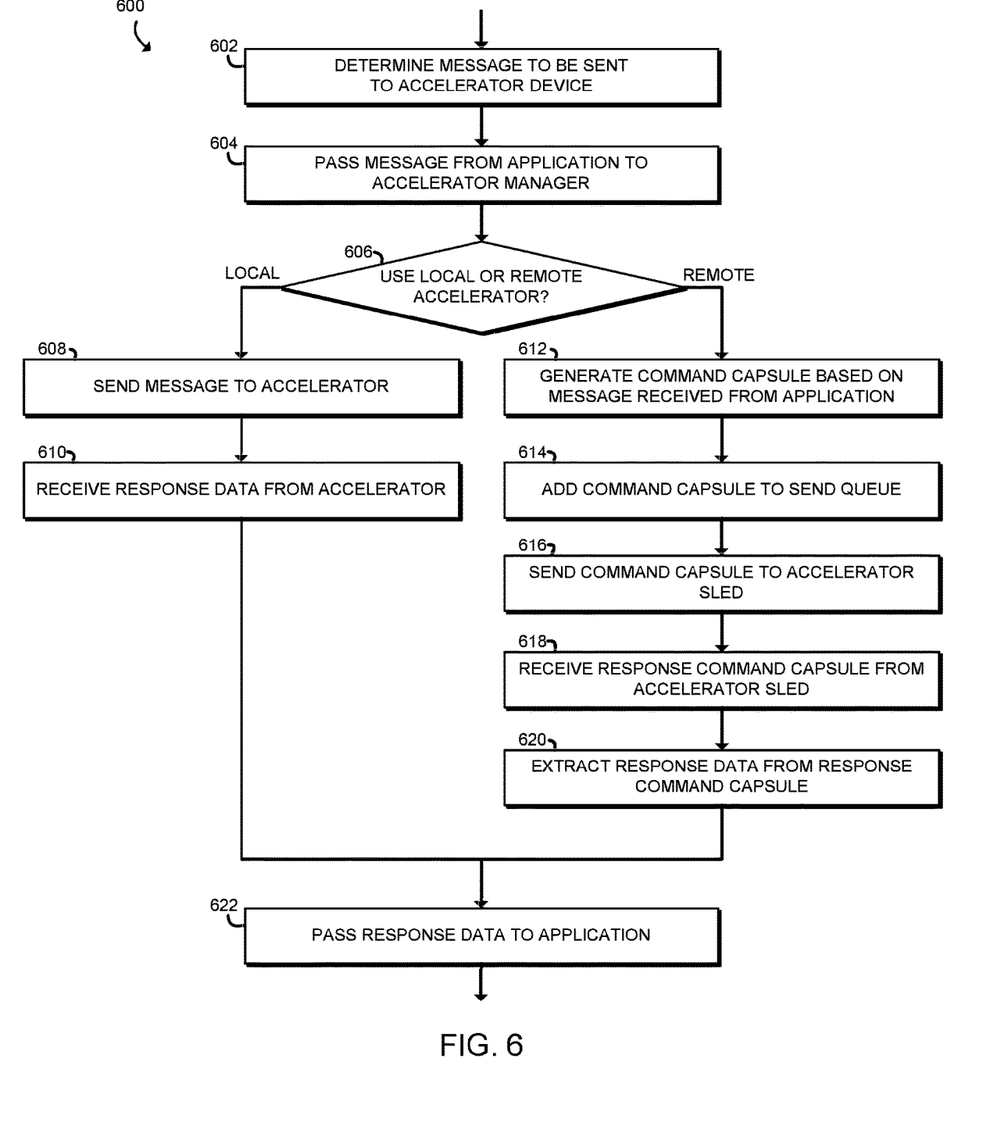
FIG. 6 is a simplified flow diagram of at least one embodiment of a method for sending an accelerator command to an accelerator sled that may be executed by the compute device of FIG. 1.

Referring now to FIG. 6, in use, the compute device 102 may execute a method 600 for sending an accelerator message to an accelerator device 212 or 308. The method 600 begins in block 602, in which an application on the compute device 102 determines a message to be sent to an accelerator device 212 or 308. The message may be embodied as an instruction to read or write data, a command to execute a certain function, a instruction to get or set a setting on an accelerator, a control command such as a query regarding the capability of an accelerator queue, and/or any other suitable message. In block 604, the application passes the command or function to the accelerator manager 402. In the illustrative embodiment, the application passes the command or function with use of an application programming interface such that the details of communication with the accelerator device 212 or 308 are hidden from the associated application.

In block 606, if the accelerator manager 402 is to pass the message to a local accelerator device 212, the method 600 proceeds to block 608, in which the accelerator manager 402 passes the message to the local accelerator device 212. The accelerator manager 402 may pass the message to the accelerator device 212 in any suitable manner, such as by sending the message over a bus such as a Peripheral Component Interconnect Express (PCIe) bus, a QuickPath interconnect, a HyperTransport interconnect, etc. The accelerator manager 402 may select a local accelerator device 212 or a remote accelerator device 308 based on any number of factors, such as the physical presence or absence of the local accelerator device 212 and/or the remote accelerator device 308, a present usage of the local accelerator device 212 and/or the remote accelerator device 308, a configuration setting of the accelerator manager 402 that may be set by an administrator of the system 100, etc.

In block 610, the accelerator manager 402 of the compute device 102 receives response data from the accelerator device 212. It should be appreciated that, in some embodiments, certain messages may not warrant a response. For example, an instruction to write certain data to a certain location may not require a response. However, certain other messages may warrant a response, such as an instruction to execute a certain command, in which case the response data may be an output calculated by executing the command. The method 600 then proceeds to block 622, in which the accelerator manager 402 passes the response data to the application. The accelerator manager 402 may pass the response data to the application in any suitable way, such as by triggering an interrupt or setting a semaphore in a memory location.

Referring back to block 606, if the accelerator manager 402 is to pass the message to a remote accelerator device 308, the method 600 proceeds to block 612, in which the compute device 102 generates a command capsule based on the message received from the application. The command capsule may contain a command header portion, which may contain information such as the type of command to be executed, and a data portion, which may contain data such as parameters to be used when executed the command. The command capsule may augment the received message with metadata, such as an indication of the requesting compute device 102 or the requesting processor 202, and/or the command capsule may rearrange or otherwise reorganize the message in preparation for being sent to the accelerator sled 104. In some embodiments, the command capsule may encapsulate the message in a protocol different from a protocol used by the message.

In block 614, the compute device 102 adds the command capsule to the send queue. In some embodiments, the compute device 102 may determine the appropriate queue to send the command capsule to, such as a control queue if the message is a control command, a low-latency data queue if the message is a low-latency command, or a bulk data queue if the message is a bulk message such as a message with a large amount of data. The compute device 102 may send commands that are associated with a small amount of data and/or a short execution time to the low-latency data path queue and send commands that are associated with a large amount of data and/or a long execution time to the bulk data path queue. In some embodiments, the command may include an indication which queue should be used. In block 616, the compute device 102 sends the command capsule to the accelerator sled 104. The compute device 102 may use any suitable communication protocol, such as TCP, RDMA, RoCE, RoCEv2, iWARP, etc.

In block 618, the compute device 102 receives a response command capsule from the accelerator sled 104 after the accelerator sled 104 has processed the message contained in the command capsule. It should be appreciated that, in some embodiments, certain messages may not warrant a response. For example, an instruction to write certain data to a certain location may not require a response. However, certain other messages may warrant a response, such as an instruction to execute a certain command, in which case the response data may be an output calculated by executing the command.

In block 620, the compute device 102 extracts response data from the response command capsule. The method 600 then proceeds to block 622, in which the accelerator manager 402 passes the response data to the application.

Figure 7:
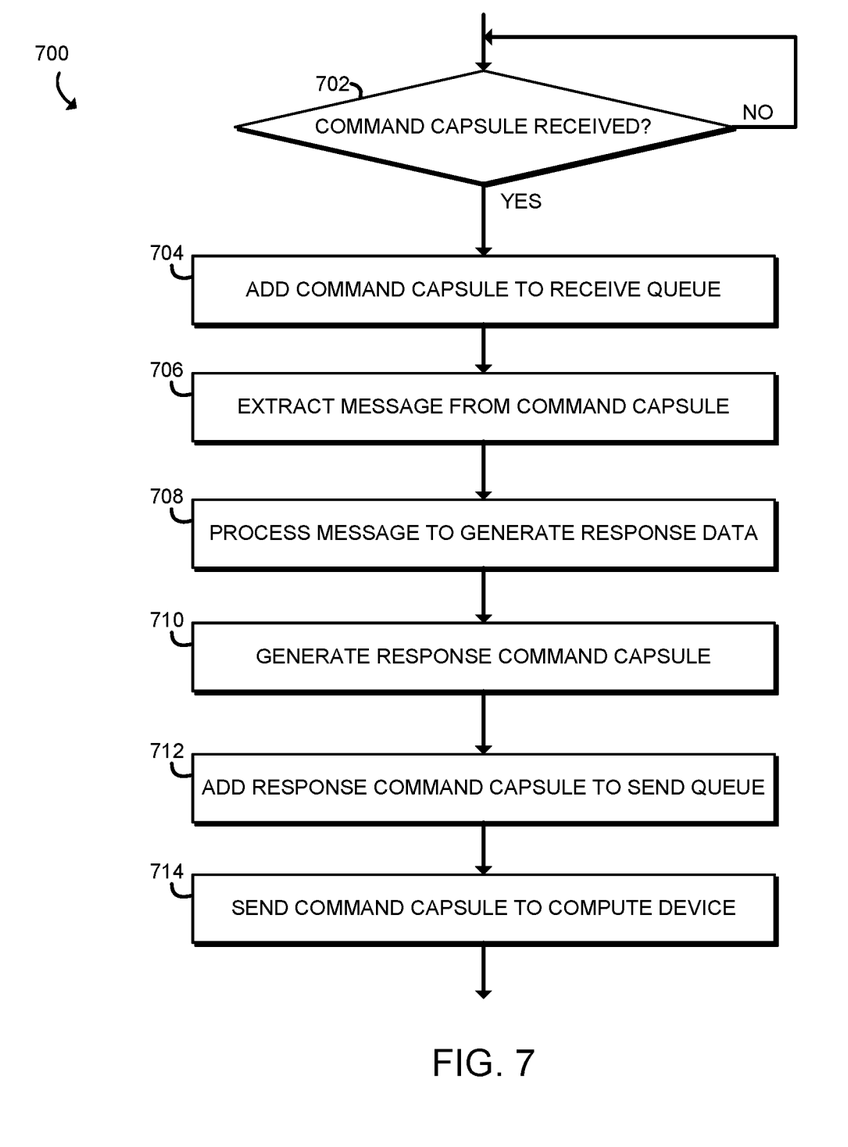
FIG. 7 is a simplified flow diagram of at least one embodiment of a method for receiving and executing an accelerator command from a compute device that may be executed by the accelerator sled of FIG. 1.

Referring now to FIG. 7, in use, the accelerator sled 104 may execute a method 700 for receiving and processing a command capsule from a compute device 102. The method 700 begins in block 702, in which, if the accelerator sled 104 has not received a command capsule, the method 700 loops back to block 702 to wait for a command capsule. Otherwise, if the accelerator sled 104 has received a command capsule, the method 700 proceeds to block 704, in which the accelerator sled 104 adds the received command capsule to a receive queue. In some embodiments, the accelerator sled 104 may maintain several receive queues, such as a control receive queue and a data receive queue. The control receive queue may be used for control commands such as initializing a connection with an accelerator device 308, querying the capability of an accelerator device 308, providing credentials to access an accelerator device 308, etc. The data receive queue may be used for messages relating to directly accessing the accelerator device 308, such as reading or writing data, instructing the accelerator device 308 to execute a certain program, etc. The various queues of the accelerator device 308 may in some embodiments by processed in software (i.e., with a general purpose processor and memory), hardware (i.e., in specialized hardware configured to perform certain instructions faster or more efficiently than a general purpose processor), and/or a combination of software and hardware. In the illustrative embodiment, the control receive queue may be processed in software while the data receive queue may be processed in hardware. Additionally or alternative, the accelerator sled 104 may include several data receive queues, such as a low-latency receive queue for messages which should be processed quickly and a bulk data receive queue for messages which may contain a large amount of data or can be processed when resources are available. The accelerator sled 104 may include receive queues associated with different accelerator devices 308 and may assign a message to a particular receive queue based on the target accelerator device 308.

In block 706, the accelerator sled 104 removes the command capsule from the receive queue in which it was placed and extracts the message from the command capsule. As part of extracting the message from the command capsule, the accelerator sled 104 may, for example, remove protocol headers and overhead from the command capsule to arrive at the original message. In block 708, the accelerator sled 104 processes the message. The accelerator sled 104 may process the message by reading or writing data to or from an accelerator device 308, passing a command to an accelerator device 308, determining a response to a control command such as a query for information related to the accelerator device 308, etc. The accelerator sled 104 generates response data after processing the message. It should be appreciated that, in some embodiments, certain messages may not warrant a response. For example, an instruction to write certain data to a certain location may not require a response. However, certain other messages may warrant a response, such as an instruction to execute a certain command, in which case accelerator sled 104 may generate the response data by executing the command and receiving and output result. In some embodiments, the accelerator sled 104 may configure a single physical accelerator device 308 to appear as two or more virtual accelerator devices 308. In such embodiments, the accelerator sled 104 may perform certain virtualization tasks such as context switching and/or device partitioning in order to process the message. It should be appreciated that, in some embodiments, the accelerator sled 104 may process messages received in the receive queue asynchronously. For example, the accelerator sled 104 may complete processing a first message received in the receive queue that can be processed quickly, such as writing a small amount of data before completing processing of a second message received in the receive queue before the first message that may take longer to process, such as by executing a command on an accelerator device 308 which takes a long time to be executed. As another example, the accelerator sled 104 may, in some embodiments, begin processing messages received in the queue out of order.

In block 710, the accelerator sled 104 generates a response command capsule including the result data. In block 712, the accelerator sled 104 adds the response command capsule to the send queue. The accelerator sled 104 may include several send queues, similar to the several receive queues (e.g., a control path send queue, a data path queue, different sets of queues for different accelerator devices 308, etc.). In the illustrative embodiment, the control path send queue is implemented in software and the data path queue is implemented in hardware. In block 714, the accelerator sled 104 sends the command capsule to the compute device 102.

EXAMPLES

Illustrative examples of the devices, systems, and methods disclosed herein are provided below. An embodiment of the devices, systems, and methods may include any one or more, and any combination of, the examples described below.

Example 1 includes a compute device for remotely accessing an accelerator device of an accelerator sled, the compute device comprising a processor; a memory comprising a plurality of instructions stored thereon that, when executed, cause the compute device to receive a message from an application executing on the compute device; generate a command capsule based on the message; send the command capsule to the accelerator sled without instruction from the application indicating that the message should be sent to the accelerator sled; receive a response command capsule from the accelerator sled; extract response data from the response command capsule; and pass the response data to the application.

Example 2 includes the subject matter of Example 1, and wherein to send the command capsule to the accelerator sled comprises to add the command capsule to a send queue; and process the send queue.

Example 3 includes the subject matter of any of Examples 1 and 2, and wherein to add the command capsule to the send queue comprises to add the command capsule to a low-latency data queue based on the message.

Example 4 includes the subject matter of any of Examples 1-3, and wherein the plurality of instructions further cause the compute device to receive a second message from the application executing on the compute device; generate a second command capsule based on the second message; add the second command capsule to a bulk data queue based on the second message prior to addition of the command capsule to the low-latency data queue; and send the second command capsule after the command capsule is sent.

Example 5 includes the subject matter of any of Examples 1-4, and wherein to send the command capsule to the accelerator sled comprises to determine whether the message is a control command; add, in response to a determination that the message is the control command, the command capsule to a control path send queue; and add, in response to a determination that the message is the control command, the command capsule to a data path send queue.

Example 6 includes the subject matter of any of Examples 1-5, and wherein the compute device comprises a plurality of processors, wherein to determine the message to be sent to from the application to the accelerator device comprises to determine, by the processor, the message to be sent from the application to the accelerator device, and wherein to send the command capsule to the accelerator sled comprises to add the command capsule to a send queue associated with the processor based on the association of the processor with the determination of the message, wherein the compute device comprises one or more send queues not associated with the processor.

Example 7 includes the subject matter of any of Examples 1-6, and wherein the command capsule comprises a command header portion and a data portion.

Example 8 includes the subject matter of any of Examples 1-7, and wherein to send the command capsule to the accelerator sled comprises to send the command capsule to the accelerator sled with use of remote direct memory access (RDMA), and wherein to receive the response command capsule from the accelerator sled comprises to receive an RDMA command from the accelerator sled.

Example 9 includes the subject matter of any of Examples 1-8, and further including a local accelerator device, wherein the plurality of instructions further causes the compute device to determine whether the message should be sent to the local accelerator device or to the accelerator device of the accelerator sled without instruction from the application indicating that the message should be sent to the accelerator sled, wherein to generate the command capsule based on the received message comprises to generate, in response to a determination that the message should be sent to the accelerator device of the accelerator sled, the command capsule based on the received message; receive a second message from the application executing on the compute device; send the second message to the local accelerator device without instruction from the application indicating whether the second message should be sent to the accelerator sled; receive second response data from the local accelerator device; and pass the second response data to the application.

Example 10 includes the subject matter of any of Examples 1-9, and wherein the local accelerator device comprises a field programmable gate array.

Example 11 includes the subject matter of any of Examples 1-10, and wherein the local accelerator device comprises an application specific integrated circuit.

Example 12 includes the subject matter of any of Examples 1-11, and wherein the local accelerator device comprises a graphics processing unit.

Example 13 includes the subject matter of any of Examples 1-12, and wherein the accelerator device comprises a field programmable gate array.

Example 14 includes the subject matter of any of Examples 1-13, and wherein the accelerator device comprises an application specific integrated circuit.

Example 15 includes the subject matter of any of Examples 1-14, and wherein the accelerator device comprises a graphics processing unit.

Example 16 includes a method for remotely accessing an accelerator device of an accelerator sled by a compute device, the method comprising receiving, by an accelerator manager of the compute device, a message from an application executing on the compute device; generating, by the accelerator manager, a command capsule based on the message; sending, by the accelerator manager, the command capsule to the accelerator sled without instruction from the application indicating that the message should be sent to the accelerator sled; receiving, by the accelerator manager, a response command capsule from the accelerator sled; extracting, by the accelerator manager, response data from the response command capsule; and passing, by the compute device, the response data from the accelerator manager to the application.

Example 17 includes the subject matter of Example 16, and wherein sending the command capsule to the accelerator sled comprises adding the command capsule to a send queue; and processing the send queue.

Example 18 includes the subject matter of any of Examples 16 and 17, and wherein adding the command capsule to the send queue comprises adding the command capsule to a low-latency data queue based on the message.

Example 19 includes the subject matter of any of Examples 16-18, and further including receiving, by the accelerator manager, a second message from an application executing on the compute device; generating, by the accelerator manager, a second command capsule based on the second message; adding, by the compute device, the second command capsule to a bulk data queue based on the second message prior to addition of the command capsule to the low-latency data queue; and sending, by the compute device, the second command capsule after the command capsule is sent.

Example 20 includes the subject matter of any of Examples 16-19, and wherein sending the command capsule to the accelerator sled comprises determining whether the message is a control command; adding, in response to a determination that the message is the control command, the command capsule to a control path send queue; and adding, in response to a determination that the message is the control command, the command capsule to a data path send queue.

Example 21 includes the subject matter of any of Examples 16-20, and wherein the compute device comprises a plurality of processors, wherein to determine the message to be sent to from the application to the accelerator device comprises to determine, by a processor of the plurality of processors, the message to be sent from the application to the accelerator device, and wherein to send the command capsule to the accelerator sled comprises to add the command capsule to a send queue associated with the processor based on the association of the processor with the determination of the message, wherein the compute device comprises one or more send queues not associated with the processor.

Example 22 includes the subject matter of any of Examples 16-21, and wherein the command capsule comprises a command header portion and a data portion.

Example 23 includes the subject matter of any of Examples 16-22, and wherein sending, by the accelerator manager, the command capsule to the accelerator sled comprises sending the command capsule to the accelerator sled with use of remote direct memory access (RDMA), and wherein receiving, by the accelerator manager, the response command capsule from the accelerator sled comprises receiving, by the accelerator manager, an RDMA command from the accelerator sled.

Example 24 includes the subject matter of any of Examples 16-23, and wherein the compute device further comprises a local accelerator device, the method further comprising determining whether the message should be sent to the local accelerator device or to the accelerator device of the accelerator sled without instruction from the application indicating that the message should be sent to the accelerator sled, wherein generating the command capsule based on the received message comprises generating, in response to a determination that the message should be sent to the accelerator device of the accelerator sled, the command capsule based on the received message; receiving, by the accelerator manager, a second message from the application executing on the compute device; sending, by the accelerator manager, the second message to the local accelerator device without instruction from the application indicating that the second message should be sent to the accelerator sled; receiving, by the accelerator manager, second response data from the local accelerator device; and passing, by the compute device, the second response data from the accelerator manager to the application.

Example 25 includes the subject matter of any of Examples 16-24, and wherein the local accelerator device comprises a field programmable gate array.

Example 26 includes the subject matter of any of Examples 16-25, and wherein the local accelerator device comprises an application specific integrated circuit.

Example 27 includes the subject matter of any of Examples 16-26, and wherein the local accelerator device comprises a graphics processing unit.

Example 28 includes the subject matter of any of Examples 16-27, and wherein the accelerator device comprises a field programmable gate array.

Example 29 includes the subject matter of any of Examples 16-28, and wherein the accelerator device comprises an application specific integrated circuit.

Example 30 includes the subject matter of any of Examples 16-29, and wherein the accelerator device comprises a graphics processing unit.

Example 31 includes one or more computer-readable media comprising a plurality of instructions stored thereon that, when executed, causes a compute device to perform the method of any of Examples 16-30.

Example 32 includes a compute device comprising means to perform the method of any of Examples 16-30.

Example 33 includes a compute device for remotely accessing an accelerator device of an accelerator sled, the compute device comprising means for receiving a message from an application executing on the compute device; means for generating a command capsule based on the message; circuitry for sending the command capsule to the accelerator sled without instruction from the application indicating that the message should be sent to the accelerator sled; circuitry for receiving a response command capsule from the accelerator sled; means for extracting response data from the response command capsule; and means for passing the response data to the application.

Example 34 includes the subject matter of Example 33, and wherein the circuitry for sending the command capsule to the accelerator sled comprises means for adding the command capsule to a send queue; and means for processing the send queue.

Example 35 includes the subject matter of any of Examples 33 and 34, and wherein the means for adding the command capsule to the send queue comprises means for adding the command capsule to a low-latency data queue based on the message.

Example 36 includes the subject matter of any of Examples 33-35, and further including means for receiving a second message from the application executing on the compute device; means for generating a second command capsule based on the second message; means for adding the second command capsule to a bulk data queue based on the second message prior to addition of the command capsule to the low-latency data queue; and circuitry for sending the second command capsule after the command capsule is sent.

Example 37 includes the subject matter of any of Examples 33-36, and wherein the circuitry for sending the command capsule to the accelerator sled comprises means for determining whether the message is a control command; means for adding, in response to a determination that the message is the control command, the command capsule to a control path send queue; and means for adding, in response to a determination that the message is the control command, the command capsule to a data path send queue.

Example 38 includes the subject matter of any of Examples 33-37, and wherein the compute device comprises a plurality of processors, wherein the means for determining the message to be sent to from the application to the accelerator device comprises means for determining, by a processor of the plurality of processors, the message to be sent from the application to the accelerator device, and wherein the circuitry for sending the command capsule to the accelerator sled comprises means for adding the command capsule to a send queue associated with the processor based on the association of the processor with the determination of the message, wherein the compute device comprises one or more send queues not associated with the processor.

Example 39 includes the subject matter of any of Examples 33-38, and wherein the command capsule comprises a command header portion and a data portion.

Example 40 includes the subject matter of any of Examples 33-39, and wherein the circuitry for sending the command capsule to the accelerator sled comprises circuitry for sending the command capsule to the accelerator sled with use of remote direct memory access (RDMA), and wherein the circuitry for receiving the response command capsule from the accelerator sled comprises circuitry for receiving an RDMA command from the accelerator sled.

Example 41 includes the subject matter of any of Examples 33-40, and wherein the compute device further comprises a local accelerator device, the method further comprising means for determining whether the message should be sent to the local accelerator device or to the accelerator device of the accelerator sled without instruction from the application indicating that the message should be sent to the accelerator sled, wherein the means for generating the command capsule based on the received message comprises means for generating, in response to a determination that the message should be sent to the accelerator device of the accelerator sled, the command capsule based on the received message; means for receiving a second message from the application executing on the compute device; circuitry for sending the second message from the accelerator manager to the local accelerator device without instruction from the application indicating that the second message should be sent to the accelerator sled; circuitry for receiving second response data from the local accelerator device; and means for passing the second response data to the application.

Example 42 includes the subject matter of any of Examples 33-41, and wherein the local accelerator device comprises a field programmable gate array.

Example 43 includes the subject matter of any of Examples 33-42, and wherein the local accelerator device comprises an application specific integrated circuit.

Example 44 includes the subject matter of any of Examples 33-43, and wherein the local accelerator device comprises a graphics processing unit.

Example 45 includes the subject matter of any of Examples 33-44, and wherein the accelerator device comprises a field programmable gate array.

Example 46 includes the subject matter of any of Examples 33-45, and wherein the accelerator device comprises an application specific integrated circuit.

Example 47 includes the subject matter of any of Examples 33-46, and wherein the accelerator device comprises a graphics processing unit.

The invention claimed is:

1. A compute device comprising:
    a processor; and
    circuitry to execute an accelerator manager, the accelerator manager to:
        receive a first message and a second message from a first application executing on the compute device;
        determine to use a first accelerator resident at the compute device instead of a second accelerator located remote from the compute device based, at least in part, on usage of at least one of the first accelerator and the second accelerator;
        responsive to a determination to use the first accelerator, forward the first message to the first accelerator;
        determine to use the second accelerator to process the second message based, at least in part, on the usage of at least one of the first accelerator and the second accelerator;
        generate a command message based, at least in part, on the second message from the first application;
        cause the command message to be sent to the second accelerator;
        receive a first response message from the first accelerator that includes first response data generated responsive to the first message;
        receive a second response message from the second accelerator that includes second response data generated responsive to the command message; and
        forward the first response data and the second response data to the first application.

2. The compute device of claim 1, wherein to cause the command message to be sent to the second accelerator comprises the accelerator manager to:
    add the command message to a send queue; and
    process the send queue to cause the command message to be sent from the send queue to the second accelerator.

3. The compute device of claim 2, the send queue includes a low-latency data path queue and a bulk data path queue, wherein to add the command message to the send queue comprises the accelerator manager to add the command message to the low-latency data path queue based on the second message from the first application indicating the second response data is to be time-sensitive or add the command message to the bulk data path queue based on the second message from the first application indicating the second response data is to not be time-sensitive.

4. The compute device of claim 1, wherein to receive the second response message from the second accelerator and forward the second response data to the first application comprises the accelerator manager to:
    add the received second response message to a receive queue; and
    process the receive queue to forward the second response data included in the second response message to the first application.

5. The compute device of claim 4, the receive queue includes a low-latency data path queue and a bulk data path queue, wherein to add the received second response message to the receive queue includes the accelerator manager to add the second received response message to the low-latency data path queue based on the second message from the first application indicating the second response data is time-sensitive or add the second response message to the bulk data path queue based on the second message from the first application indicating the second response data is not time-sensitive.

6. The compute device of claim 1,
    wherein to send the command message to the second accelerator includes the accelerator manager to cause the command message to be sent to the second accelerator via use of a remote direct memory access (RDMA) communication protocol, and
    wherein to receive the second response message from the second accelerator includes the accelerator manager to receive the second response message from the second accelerator via use of the RDMA communication protocol.

7. The compute device of claim 1, wherein the first or second accelerator comprises a field programmable gate array.

8. The compute device of claim 2, the send queue includes a control path queue, wherein to add the command message to the send queue comprises the accelerator manager to add the command message to the control path queue based on the second message from the first application indicating a querying of capabilities for an accelerator.

9. A method comprising:
receiving, by circuitry of a compute device, a first message and a second message from a first application executing on the compute device;
determining to use a first accelerator resident at the compute device instead of a second accelerator located remote from the compute device based, at least in part, on usage of at least one of the first accelerator and the second accelerator;
responsive to determining to use the first accelerator, forwarding the first message to the first accelerator;
determining to use the second accelerator to process the second message based, at least in part, on the usage of at least one of the first accelerator and the second accelerator;
generating a command message based, at least in part, on the second message from the first application;
causing the command message to be sent to the second accelerator;
receiving a first response message from the first accelerator that includes first response data generated responsive to the first message;
receiving a second response message from the second accelerator that includes second response data generated responsive to the command message; and
forwarding the first response data and the second response data to the first application.

10. The method of claim 9, wherein causing the second command message to be sent to the second accelerator comprises:
adding the command message to a send queue; and
processing the send queue to cause the command message to be sent from the send queue to the second accelerator.

11. The method of claim 10, the send queue includes a low-latency data path queue and a bulk data path queue, wherein adding the command message to the send queue comprises adding the command message to the low-latency data path queue based on the second message from the first application indicating the second response data is to be time-sensitive or add the command message to the bulk data path queue based on second message from the first application indicating the second response data is to not be time-sensitive.

12. The method of claim 9, wherein receiving the second response message from the second accelerator and forwarding the second response data to the first application further comprises:
adding the received second response message to a receive queue; and
processing the receive queue to forward the second response data included in the second response message to the first application.

13. The method of claim 12, the receive queue includes a low-latency data path queue and a bulk data path queue, wherein adding the received second response message to the receive queue includes adding the second received response message to the low-latency data path queue based on the second message from the first application indicating the second response data is to be time-sensitive or add the second response message to the bulk data path queue based on the second message from the first application indicating the second response data is to not be time-sensitive.

14. The method of claim 9, wherein sending the command message to the second accelerator includes causing the command message to be sent to the second accelerator via use of a remote direct memory access (RDMA) communication protocol, and
wherein receiving the second response message from the second accelerator includes receiving the second response message from the second accelerator via use of the RDMA communication protocol.

15. The compute device of claim 10, the send queue includes a control path queue, wherein adding the command message to the send queue comprises adding the command message to the control path queue based on the second message from the first application indicating a querying of capabilities for an accelerator.

16. One or more non-transitory computer-readable media comprising a plurality of instructions stored thereon that, when executed, causes a compute device to:
receive a first message and a second message from a first application executing on the compute device;
determine to use a first accelerator resident at the compute device instead of a second accelerator located remote from the compute device based, at least in part, on usage of at least one of the first accelerator and the second accelerator;
responsive to a determination to use the first accelerator, forward the first message to the first accelerator;
determine to use the second accelerator to process the second message based, at least in part, on the usage of at least one of the first accelerator and the second accelerator;
generate a command based, at least in part, on the second message from the first application;
cause the command message to be sent to the second accelerator;
receive a first response message from the first accelerator that includes first response data generated responsive to the first message;
receive a second response message from the second accelerator that includes second response data generated responsive to the command message; and
forward the first response data and the second response data to the first application.

17. The one or more non-transitory computer-readable media of claim 16, wherein to cause the command message to be sent to the second accelerator comprises to:
add the command message to a send queue; and
process the send queue to cause the command message to be sent from the send queue to the second accelerator.

18. The one or more non-transitory computer-readable media of claim 17, the send queue includes a low-latency data path queue and a bulk data path queue, wherein to add the command message to the send queue comprises to add the command message to the low-latency data path queue based on the second message from the first application indicating the second response data is to be time-sensitive or add the command message to the bulk data path queue based on second message from the first application indicating the second response data is to not be time-sensitive.

19. The one or more non-transitory computer-readable media of claim 18, wherein to receive the second response message from the second accelerator and forward the second response data to the first application further comprises the plurality of instructions to cause the compute device to:
    add the received second response message to a receive queue; and
    process the receive queue to forward the second response data included in the second response message to the first application.

20. The one or more non-transitory computer-readable media of claim 16, wherein to send the command message to the second accelerator includes causing the command message to be sent to the second accelerator via use of a remote direct memory access (RDMA) communication protocol, and
    wherein to receive the second response message from the second accelerator includes receiving the second response message from the second accelerator via use of the RDMA communication protocol.

21. The one or more non-transitory computer-readable media of claim 16, wherein the first or second accelerator comprises a field programmable gate array.

22. The one or more non-transitory computer-readable media of claim 17, the send queue includes a control path queue, wherein adding the command message to the send queue comprises adding the command message to the control path queue based on the second message from the first application indicating a querying of capabilities for an accelerator.

\* \* \* \* \*